(12) United States Patent
Alcazar et al.

(10) Patent No.: US 7,600,256 B2
(45) Date of Patent: Oct. 6, 2009

(54) SECURITY CRITICAL DATA CONTAINERS

(75) Inventors: Mark A. Alcazar, Seattle, WA (US);
Venkata Rama Prasad Tammana, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 11/051,808

(22) Filed: Feb. 4, 2005

(65) Prior Publication Data
US 2006/0179482 A1   Aug. 10, 2006

(51) Int. Cl.
G08B 23/00 (2006.01)
G06F 12/16 (2006.01)
G06F 12/14 (2006.01)
G06F 11/00 (2006.01)

(52) U.S. Cl. ............................................ 726/22; 707/9
(58) Field of Classification Search .................... 726/22; 707/9
See application file for complete search history.

(56) References Cited

U.S. PATENT DOCUMENTS

| | | | | |
|---|---|---|---|---|
| 5,335,346 | A * | 8/1994 | Fabbio | 711/163 |
| 5,765,152 | A * | 6/1998 | Erickson | 707/9 |
| 6,047,377 | A * | 4/2000 | Gong | 726/21 |
| 6,226,618 | B1 * | 5/2001 | Downs et al. | 705/1 |
| 6,938,164 | B1 * | 8/2005 | England et al. | 713/193 |
| 2003/0037237 | A1 * | 2/2003 | Abgrall et al. | 713/166 |

FOREIGN PATENT DOCUMENTS

GB        2242295 A        9/1991

OTHER PUBLICATIONS

Li Gong; Secure Java Class Loading; Sun Microsystems; IEEE Internet; Nov.-Dec. 1998.*
Gomes, Benedict, et al., "A Language Manual for Sather 1.1", Retrieved from the Internet: URL:http://www.icsi.berkeley.edu/{sather/Documentation/LanguageDescription/Descript.pdf.gz> Oct. 2, 1996, pp. 13-38.
Papa, M. et al., "Extending Java for Package Based Access Control", Computer Security Applications, 2000. ACSA 16th Annual Conference, New Orleans, Louisiana. Dec. 11-15, 2000.

* cited by examiner

*Primary Examiner*—Christian LaForgia
*Assistant Examiner*—James Turchen
(74) *Attorney, Agent, or Firm*—Workman Nydegger (57) ABSTRACT

Described are security critical data containers for platform code, comprising a Get container and Set container that allow data to be marked as security critical for critical usage of that data, but left unmarked for non-critical usage. The number of critical methods in the code is reduced, facilitating better code analysis. A container's method may be marked as security critical, with the only access to the data via the method. By using a generic class for a Get container, access to the critical data only occurs through the property on the class, which is marked as critical. The field pointing to the generic class instance need not be critical, whereby initialization or existence checking may remain non-critical. The Set container handles security critical situations such as data that controls whether code can elevate permissions; a set method is marked as critical, while other methods can be accessed by non-critical code.

19 Claims, 4 Drawing Sheets

SECURITY CRITICAL DATA CONTAINERS

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems, and more particularly to computer system security.

BACKGROUND

In contemporary computing, computer application programs and other code may be downloaded and installed from the Internet. When downloading from an unknown or untrusted source, it is possible that such code is intentionally malicious or otherwise capable of harming or providing unauthorized access to important data. However, because there are many situations in which computer users benefit from the ability to download code and execute code without prompting, completely preventing downloading is not a practical solution to this problem.

Some environments, such as one based on Microsoft Corporation's .NET technology, attempt to solve the problems of running unknown or untrusted code by limiting what the code has permission to do. For example, the underlying platform can require that its callers have specific permissions, and while code can request the permissions it needs for the execution, the runtime will only grant permission to code based on policy that evaluates how much the code is trusted. Such permissions include things like the ability to access files and databases, connect to the Internet, interact with the user via a user interface, call into unmanaged code, and so forth. Prompting the user when a code requests such permissions is one policy-based solution, but is not very desirable because a typical user is often not equipped to make a correct security decision when prompted.

Writing secure code for platforms that enable applications to be downloaded and installed from the Internet without prompting is an extremely difficult problem. This is because the platform itself needs to have elevated privileges to properly operate. Security flaws can exist if any part of the platform code is written such that it inadvertently exposes a internal way to run untrusted code with elevated privileges, thereby allowing the untrusted code to perform unsafe operation. By way of example, the platform code needs to be able to call unmanaged code for operating system services, such as to render text on a window, while untrusted code is not allowed to do so, but if the platform code is inadvertently written such that the untrusted code can call unmanaged code via a call to a internal method of the platform code, a security flaw exists.

One solution that increases the likelihood that platform code that is securely written is to allow the developer to mark (e.g., using metadata) any part of the platform code that requires elevated permissions to run, or controls whether elevated permissions can be run, that is, the metadata indicates that the platform code is "critical" code that performs an unsecure operation. Security teams and static code analysis tools (e.g., FxCop is one such code analysis tool that checks .NET managed code assemblies) then recognize the metadata, whereby platform features can be developed so that the likelihood of platform code running with elevated privileges being exposed to untrusted code is dramatically reduced.

However, while highly valuable, the marking of such code and data as critical results in a complex code-review process that burdens a security team with many critical methods that need to be code reviewed. What is needed is a safe way to reduce the number of methods that need to be reviewed for criticality, as less-complex reviewing increases the likelihood that any security problems in the platform code will be found.

SUMMARY OF THE INVENTION

Briefly, the present invention is directed towards a system and method by which metadata describing "criticality" may be attached to any data field on a class, without making the checking of the existence/initialization of the data critical, and while still allowing access to the data in a type-safe manner. Further, for critical data that controls elevated permissions, the data may be treated as critical within a set container, by marking the method that sets the data value as critical, but not the data itself. Thus, other code that merely uses (gets) the value is not required to be critical. As a result, the number of critical methods and data fields in platform code that need to be reviewed is dramatically decreased, without compromising security.

In one implementation, a generic-based class (where generics is a .NET framework language construct similar to C++templates) provides a container for critical data. Use of the generic class means that Get access to the critical data can only happen through the property on the class, which is marked as critical. However the actual field pointing to the generic class instance need not be critical, and thus can be safely checked from code in a transparent manner. The present invention thus enables access to the contents of the data to be tracked as critical, while checking for initialization or existence of the data remains non-critical.

To this end, the present invention provides a "Get" container, via which critical data (such as where the data provides access to a critical resource, e.g., a file handle to a critical resource) may be accessed. The get method to retrieve the value of the data in the container is marked with metadata indicating that it is security critical, whereby static analysis tools will detect if there is a program flaw that allows access to that data by untrusted code. However, because the get method is marked, the data can be checked for existence/initialization (e.g., null checks may be made) without the check itself being critical. As a result, code that checks need not be marked as critical, significantly diminishing the amount of platform code that need to be security reviewed.

The present invention also provides a "Set" container, to handle situations in which a Boolean or other variable is being used to indicate whether code will elevate permissions. Because such data controls whether code elevates permissions, setting the data becomes critical, otherwise a call from untrusted code could elevate permissions. Other code that does not call the set method, such as code that actually elevates permissions provided the value is properly set, only needs to get the value, (e.g., via a get method), and thus need not be critical code. As a result of the Set container, the number of critical methods in the platform code is also significantly reduced.

Other advantages will become apparent from the following detailed description when taken in conjunction with the drawings, in which:

DETAILED DESCRIPTION

Exemplary Operating Environment

Figure 1:
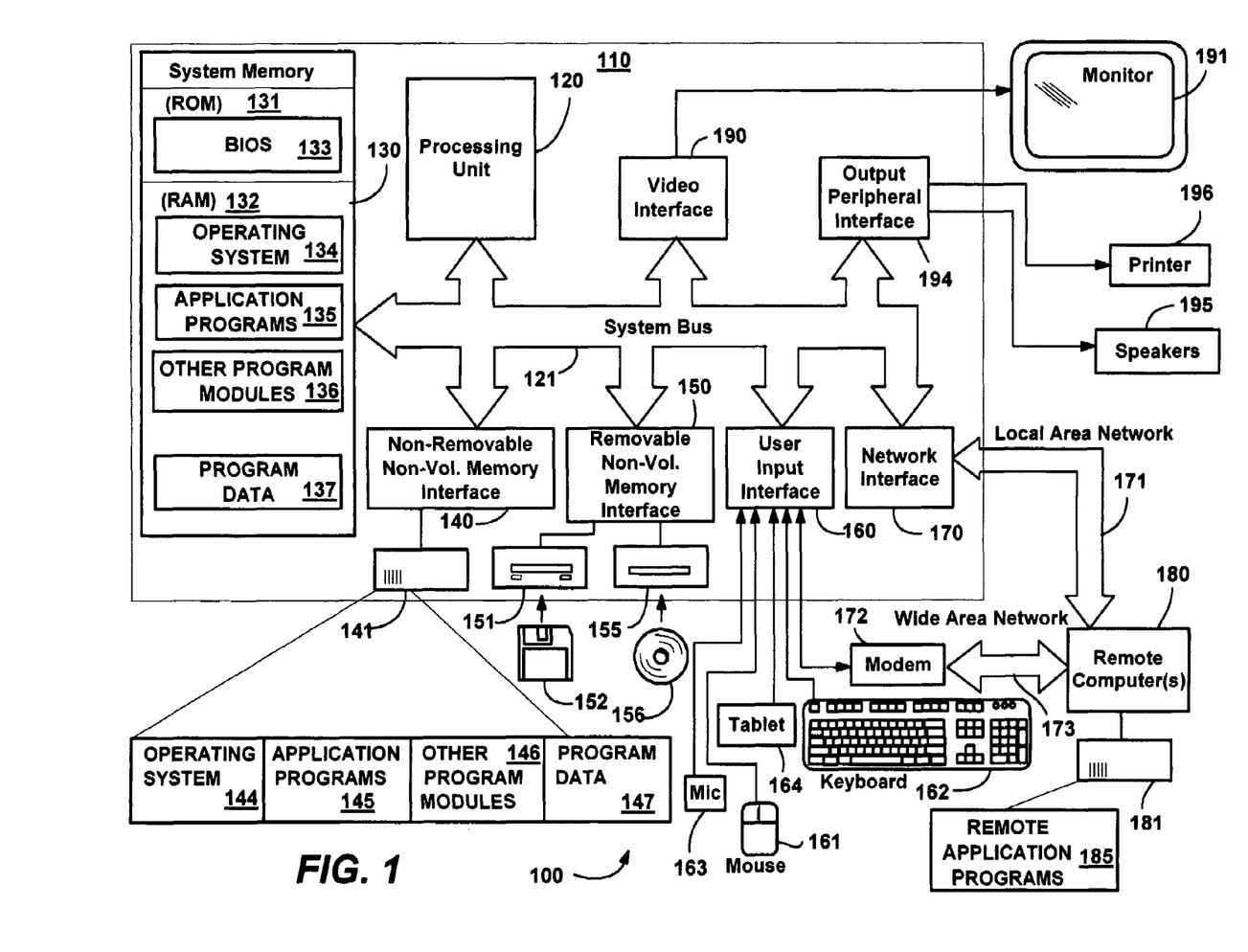
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Security Critical Data Containers

The present invention is generally directed towards a system and method by which metadata describing "criticality" to be attached to data, without making the checking of the existence/initialization of the data to be made critical. As will be understood, the present invention is primarily described with reference to generic (a .NET framework language construct similar to C++ templates) class containers using C# code examples for use in platform code. Notwithstanding, these are only examples, and the present invention is not limited to .NET, C#, platform code or any of the examples shown herein. It will be readily appreciated that numerous ways to implement the present invention are alternatively feasible, and as such, the present invention is not limited to any of the particular examples used herein, but rather may be used various ways that provide benefits and advantages in computing in general.

Figure 2A:
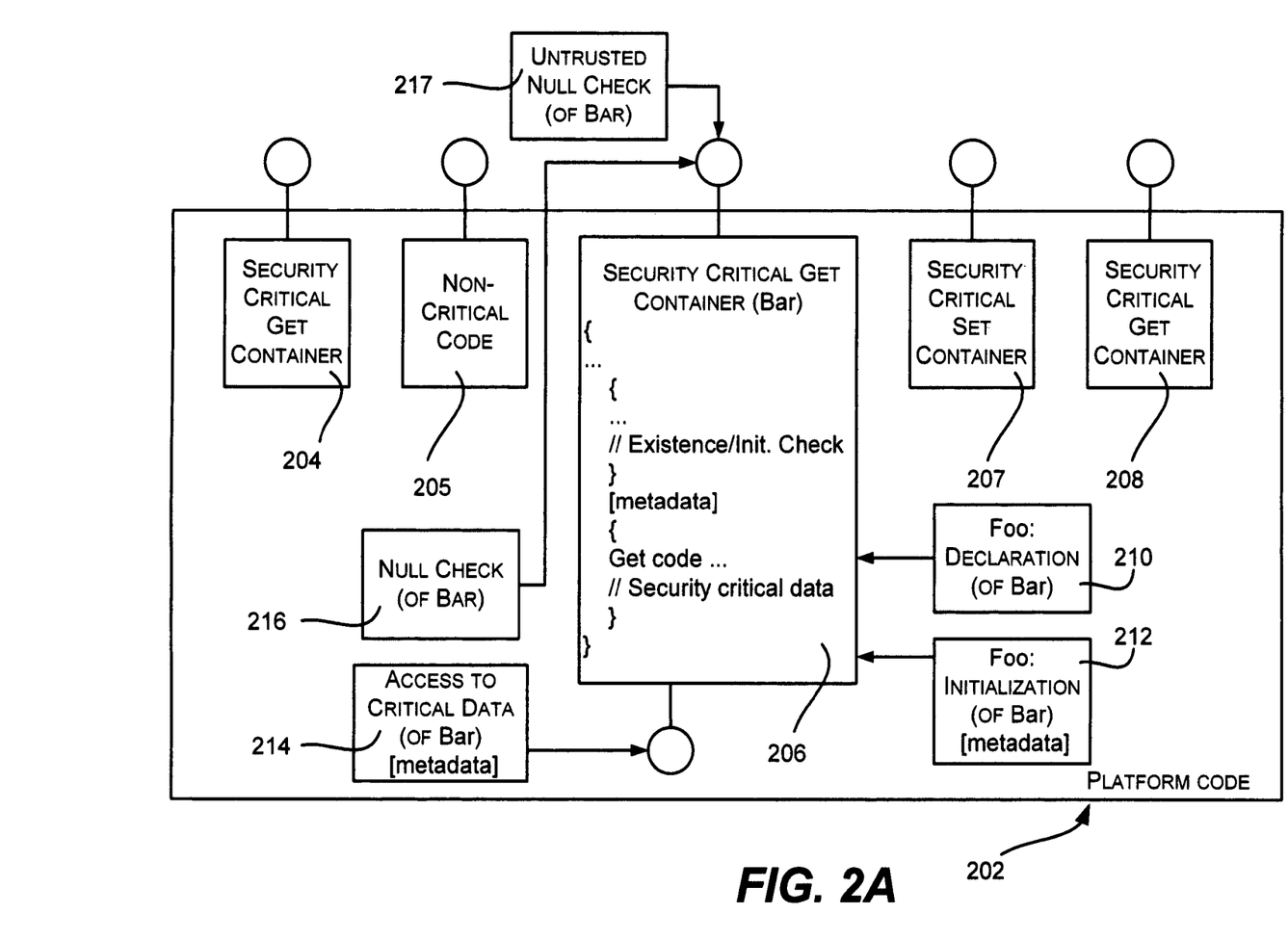
FIGS. 2A and 2B are representations of platform code containing set and get containers, in accordance with various aspects of the present invention.
Figure 2B:
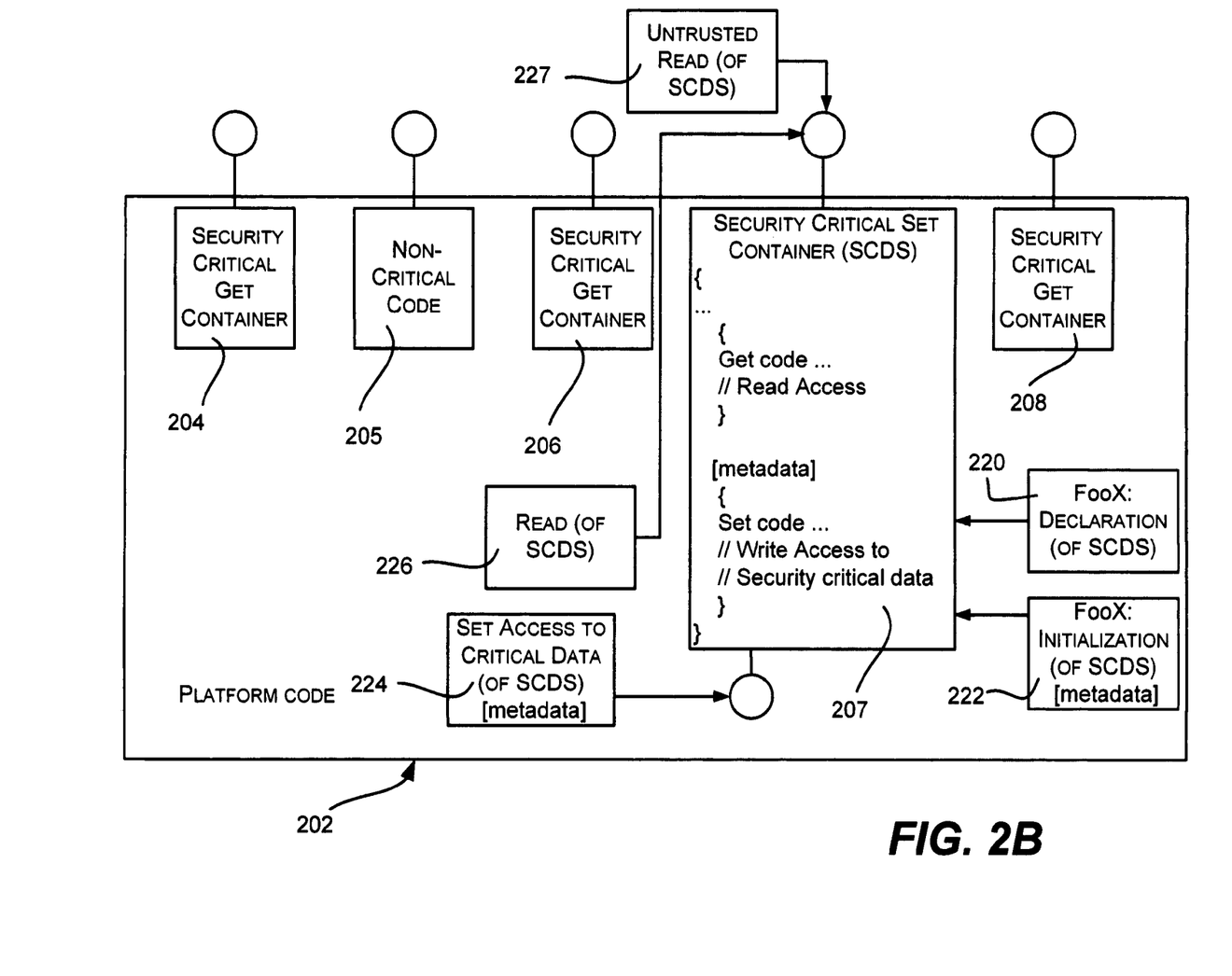

FIG. 2A and 2B show platform code 202 having various objects 204-208 there with internal methods that can be called by other code, including untrusted code. Some of the code may be non-critical, as represented via object 205, while other code may be security critical, as represented via objects 204 and 206-208. As can be readily appreciated, there should not be a way for internal methods to directly or indirectly violate criticality rules, such as by inadvertently allowing a call to the non-critical code 205 to in turn call security critical code, such as a subset of the code in the object 208.

In accordance with an aspect of the present invention, there are provided containers for critical data, where the method or methods selectively control whether the data is to be critical depending on what is being requested by the caller. One such container is a get container, and includes a get method that may be marked as critical, whereby the code will be checked so that there is no way for untrusted code to get the data value.

More particularly, by using a generic class for the Get container, access to the critical data can only occur through the property on the class, which is marked as critical. However, because the actual field pointing to the generic class instance need not be critical, the existence/initialization of the data may be safely checked from code in a non-critical manner, that is, by code running with the permissions of the application program. The present invention thus enables access to the content of the data to be tracked as critical, while enabling non-critical checking for initialization or existence of the data.

By way of example, consider critical data, such as data that provides access to a critical resource. If an untrusted program can get this data, the rules of criticality are violated. However, marking the data as critical means than analysis tools will require that every operation involving the critical data will also need to be critical, adding complexity even where the other operations are not requesting the data itself, but rather only checking whether the data exists (e.g., null checking). Consider the following example of code for getting a value without a critical container of the present invention; as can be seen, because the variable _bar is critical, so is the null check:

```
internal class Foo
{
    //
    // Critical as _bar is critical
    // Without the use of the GetContainer - any check for null
    // is also critical.
    //
    [SecurityCritical]
    internal void MyWouldLikeToBeTransparentMethod
    {
        If( _bar == null )
    }
    [SecurityCritical]
    Bar _bar;
}
```

The container of the present invention provides a way to differentiate between Get requests and other requests related to the data. Consider the following example of code (in C#) in a Get container, exemplifying implementation of the Get class (represented in FIG. 2A by the object 206):

```
internal class SecurityCriticalData<T>
{
    [SecurityCritical, SecurityTreatAsSafe]
    internal SecurityCriticalData (T value)
    {
        [SecurityCritical]
        _value = value;
    }
    /// <SecurityNote>
    ///     Critical as it provides access to a critical resource
    /// </SecurityNote>
    [SecurityCritical]
    internal T Value
    {
        [SecurityCritical]
        get
        {
            return _value;
        }
    }
    private T _value;
}
```

As can be seen, the Get method in the container is marked with metadata (the [SecurityCritical] tag) indicating that getting the data (_value) is security critical, whereby static analysis tools will detect if there is a flaw that allows access to that data by untrusted code. Thus, in the file handle example described above, the analysis tools will check that only trusted code with elevated privileges can obtain the value of the file handle.

Declaration (represented in FIG. 2A by the block 210):

```
internal class Foo
{
...
    private SecurityCriticalData<Bar> _bar;
}
```

Initialization (represented in FIG. 2A by the block 212):

```
internal class Foo
{
...
    /// <SecurityNote>
    /// Critical - performs an elevation - unmanaged permission.
    ///</SecurityNote>
    [SecurityCritical]
    private void MyInitializeBarMethod( )
    {
new SecurityPermission(SecurityPermissionFlag.UnmanagedCode).Assert( ); //
BlessedAssert:
        try
        {
            Bar = CreateBar( );    // p-invoke requires unmanaged
                                   // code permission.
            _bar = new SecurityCriticalData<Bar>( Bar );
        }
        Finally
        {
```
```
            CodeAccessPermission.RevertAssert( );
        }
    }
}
```

Usage in getting to critical data (represented in FIG. 2A by the block 214):

```
internal class Foo
{
    /// critical - accesses critical resource _bar
    /// treat as safe - _bar is just checked not released
    /// externally.
    [SecurityCritical, SecurityTreatAsSafe]
    internal void MyCriticalMethod
    {
        ...
        If ( _bar.Value = ... )
        ...
    }
}
```

Because the Get method is marked as security critical rather than the data (value), the data can be checked for existence/initialization (e.g., NULL checks may be made) without the check itself being critical. The reduction in the number of methods marked as critical significantly diminishes the amount of platform code that need to be security reviewed. The following example checks for null (represented in FIG. 2A by the blocks 216 and 217):

```
internal class Foo
{
    // code is transparent, as checking for existence /
    // initialization of _bar is not considered critical.
    internal void MyTransparentMethod
    {
        If ( _bar == null )
    }
}
```

In accordance with another aspect of the present invention, there is provided a "Set" container, such as to handle situations in which a Boolean or other variable is being used to indicate whether code will elevate permissions. Because the value of such data controls whether code elevates permissions, setting the data becomes critical. Other code that does not call the set method (e.g., a read method) cannot change the value and thus is not critical. As a result of the Set container, the number of critical methods in the platform code is also significantly reduced.

By way of a contrasting example, consider setting a critical value without critical containers of the present invention; as can be seen, reads are critical:

```
internal class FooX
{
    ...
    [SecurityCritical]
    private bool _isWindowsFont;
    ...
    /// Still critical in this example
```

-continued

```
    [SecurityCritical]
    private void SetIsWindowsFont( )
    {
        ...
    }
    /// Critical, as reads are critical
    /// without the use of the SetContainer.
    [SecurityCritical]
    internal void ReadFonts( )
    {
        ...
        If ( _isWindowsFont)
        {
            (New FileIOPermission( )).Assert( );
            ...
        }
        ,",
    }
}
```

In accordance with the critical container aspects of the present invention, consider instead the following example code 5 for a Set container SecurityCriticalDataSetter (SCDS, represented in FIG. 2B by the object 208):

```
internal class SecurityCriticalDataSetter<T>
{
    [SecurityCritical]
    internal SecurityCriticalDataSetter(T value)
    {
        [SecurityCritical]
        _value = value;
    }
    // <SecurityNote>
    //      Critical as it provides access to a critical resource
    // </SecurityNote>
    internal T Value
    {
        [SecurityCritical, SecurityTreatAsSafe]
        get
        {
            return _value;
        }
        [SecurityCritical]
        Set
        {
            _value = value;
        }
    }
    private T _value;
}
```

Note that this code includes a method that sets a value that is deemed security critical. As a result, the set method is tagged with the [SecurityCritical] metadata.

Declaration of the SecurityCriticalDataSetter is represented in FIG. 2B by the block 220:

```
internal class FooX
{
    ...
    private SecurityCriticalDataSetter<bool> _isWindowsFont;
}
```

Initialization (represented in FIG. 2B by the block 222); note that initialization sets the value of _isWindowsFont and is thus security critical. This prevents untrusted code from using anything other than an installed Windows®-based font:

```
internal class FooX
{
    ...
    /// <SecurityNote>
    /// Critical -sets the critical data member - _isWindowsFont.
    ///</SecurityNote>
    [SecurityCritical]
    private void SetIsWindowsFont( )
    {
        _isWindowsFont =
            _currentFont.indexOf("c:\windows\fonts") > 0 ;
    }
}
```

Note that other platform code may set the value of _isWindowsFont, as represented in FIG. 2B by the block 224. Such code also needs to be marked security critical.

Reading (getting) the value of isWindowsFont is not deemed critical, and thus usage of the object's get method can be accomplished by code (represented in FIG. 2B by the blocks 226 and 227) that does not include the security critical metadata:

```
internal class FooX
{
    // Not Critical as reads are not critical
    internal void ReadFonts( )
    {
        ...
        If ( _isWindowsFont.Value )
        {
            (New FileIOPermission( )).Assert( );
            ...
        }
        ,",
    }
}
```

Figure 3:
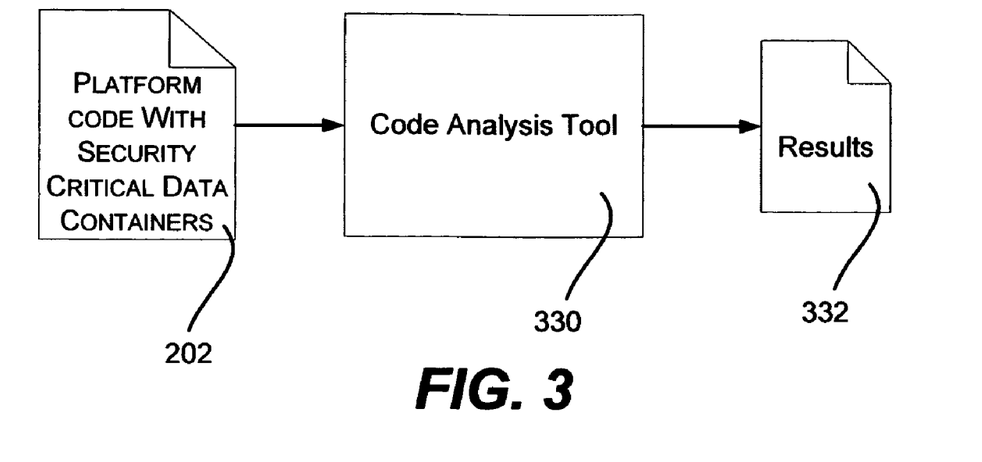
FIG. 3 is a block diagram representing a code analysis tool analyzing platform code with security critical data containers in accordance with various aspects of the present invention.

FIG. 3 shows an analysis tool 330 evaluating the platform code 202 to ensure that only security critical code can use data in a security critical data container when access to the data via a method is limited via a security critical metadata tag. The results 332 may be reviewed by a security team to and/or the developer to eliminate any flaws in the code.

Figure 4:
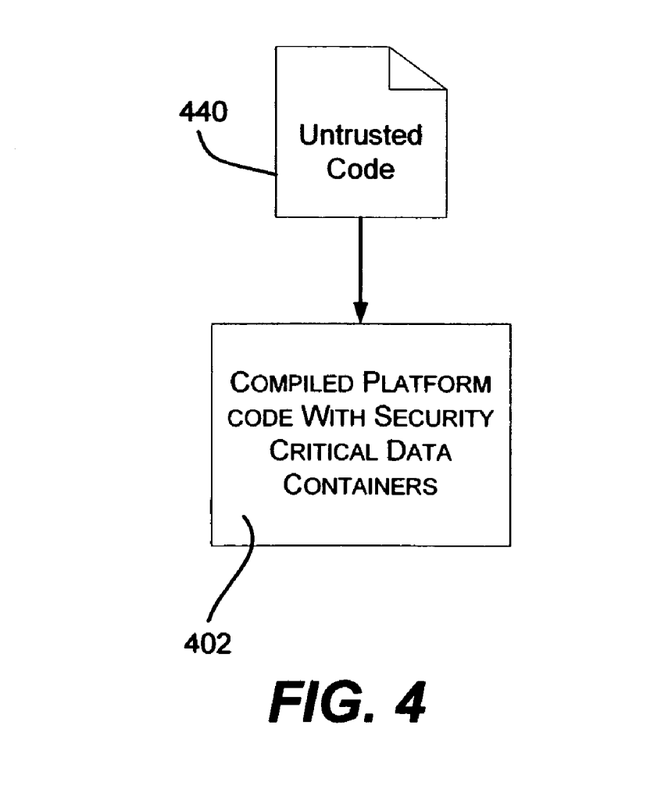
FIG. 4 is a block diagram representing untrusted code running on compiled platform code based on code having security critical data containers, in accordance with various aspects of the present invention.

FIG. 4 shows the compiled platform 402 in operation with untrusted code 440. Provided the developer properly placed critical data in a Get or Set container in accordance with various aspects of the present invention, the untrusted code 440 will not be able to improperly access the securely-contained data to perform an unsafe operations. Note that it is feasible to perform runtime checks for unsafe operations, e.g., by maintaining attributes or the like with the compiled code 402 that indicates when code, data and/or methods are critical.

As can be seen from the foregoing detailed description, there is provided a Get container and Set container that allow data to be essentially marked as security critical for critical usage of that data, but not for non-critical usage. This is accomplished by marking individual methods in the containers, rather than marking the data as a whole independent of usage. The present invention thus reduces the amount of platform code needing review, increasing the likelihood that any security problems in platform code will be found.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a computer system, a computer implemented method for configuring platform code to simplify checks for security problems, the computer implemented method comprising:
a programming language class providing a container for security critical data, the programming language class also including a plurality of methods for interacting with security critical data in the container,
a processor selectively controlling whether the security critical data is treated as security critical depending on what interaction with the security critical data is being requested by distinguishing some methods of the set container as being security critical, such that the security critical data can only be accessed via the methods with elevated permissions, including:
marking methods that access the security critical data through a property on the class as security critical methods, and
indicating that methods that access an actual field pointing to the programming language class are not security critical methods such that the existence or initialization of the security critical data can be checked in a non-critical manner without actually accessing the security critical data.

2. The method of claim 1 wherein the container comprises a get container and wherein the security critical data only can be read via a get method that is marked with elevated permissions, and existence/initialization checks may be performed by code without elevated permissions.

3. The method of claim 2 wherein the data comprises a value that provides access to a critical resource.

4. The method of claim 1 wherein the container comprises a set container and wherein the security critical data only can be set via a set method that is marked with elevated permissions.

5. The method of claim 4 further comprising a get method, and wherein the data can be read via the get method by code without elevated permissions.

6. The method of claim 5 wherein the data comprises a value that provides access to a critical resource.

7. The method of claim 5 wherein the data comprises a value indicative of whether privileges can be elevated by other code.

8. The method of claim 1 wherein the container is implemented in platform code that allows downloaded code to be executed, and further comprising analyzing the platform code via an analysis tool.

9. A computer program product for use at a computer system, the computer program product for implementing a method for configuring platform code to simplify checks for security problems, the computer program product including one or more computer storage medium having stored there on computer-executable instructions, which when executed at a processor, cause the computer system to perform the method, including the following:
a programming language class providing a container for security critical data, the programming language class also including a plurality methods for interacting with security critical data in the container;
selectively controlling whether the security critical data is treated as security critical depending on what interaction with the security critical data is being requested by distinguishing some methods of the container as being security critical, such that the security critical data only can be accessed via the methods with elevated permissions, including:
marking methods that access the security critical data through a property on the class as security critical methods; and
indicating that methods that access an actual field pointing to the programming language class are not security critical methods such that the existence or initialization of the security critical data can be checked in a non-critical manner without actually accessing the security critical data.

10. A computer program product for use at a computer system, the computer program product for implementing a method for configuring platform code to simplify checks for security problems, the computer program product including one or more computer storage medium having stored thereon computer-executable instructions, that when executed at a processor, cause the computer system to perform the method, including performing the following:
a programming language class providing a set container for security critical data, the programming language including a plurality of methods for interacting with the security critical data in the set container, the plurality of methods including a set method and a get method; and
selectively controlling whether the security critical data is treated as security critical depending on what interaction with the security critical data is being requested by distinguishing some methods of the set contain as security critical such that the security critical data can only be access via methods with elevated permissions, including:
marking the set method as a security critical method; and
indicating that the get method is not a security critical method,
such that the security critical data can be read by code without elevated permissions via the get method, and the security critical data only can be set by code with elevated permissions via the set method.

11. The computer program product of claim 10 wherein the security critical data comprises a value that provides access to a critical resource.

12. The computer program product of claim 10 wherein the security critical data comprises a value indicative of whether privileges can be elevated by other code.

13. The computer program product of claim 10 further comprising receiving a request to set the value from code with elevated permissions, and setting the value.

14. The computer program product of claim 10 further comprising receiving a request to read the security critical data from code without elevated permissions, and returning the security critical data in response to the request.

15. The computer program product of claim 10 wherein the set container is implemented in platform code that allows downloaded code to be executed, and further comprising analyzing the platform code via an analysis tool.

16. A computer program product for use at a computer system, the computer program product for implementing a method for configuring platform code to simplify checks for security problems, the computer program product including one or more computer storage having stored thereon computer-executable instructions, that when executed at a processor, cause the computer system to perform the method, including performing the following:
a programming language class providing a get container for security critical data, the programming language including a plurality of methods for interacting with the security critical data in the set container, the plurality of methods including a get method; and selectively controlling whether the security critical data is treated as security critical depending on what interaction with the security critical data is being requested by distinguishing the get method as security critical such that that the security critical data can only be access via methods with elevated permissions, including:

marking the get method as a security critical method; and indicating that one or more other methods that access an actual field pointing to the programming language class are not security critical methods, such that the security critical data only can be read by code with elevated permissions via the get method, and existence / initialization checks may be performed by code without elevated permissions.

17. The computer program product of claim 16 wherein the security critical data comprises a value that provides access to a critical resource.

18. The computer program product of claim 16 further comprising receiving a request to get the value from code with elevated permissions, and returning data corresponding to the value.

19. The computer program product of claim 16 wherein the get container is implemented in platform code that allows downloaded code to be executed, and further comprising analyzing the platform code via an analysis tool.

* * * * *